(No Model.) 2 Sheets—Sheet 1.
J. A. STUFF.
FERTILIZER DISTRIBUTER ATTACHMENT FOR CHECK ROW CORN PLANTERS.

No. 483,877. Patented Oct. 4, 1892.

Witnesses
Jas. K. McCathran
John W. Diggers

By his Attorneys,
C. A. Snow & Co.

Inventor
John A. Stuff (No Model.) 2 Sheets—Sheet 2.

J. A. STUFF.
FERTILIZER DISTRIBUTER ATTACHMENT FOR CHECK ROW CORN PLANTERS.

No. 483,877. Patented Oct. 4, 1892.

Witnesses
Jas. K. McPartlan
John D. Diggers

Inventor
John A. Stuff
By his Attorneys,
C. A. Snow & Co.

UNITED STATES PATENT OFFICE.

JOHN A. STUFF, OF BELLVILLE, OHIO.

FERTILIZER-DISTRIBUTER ATTACHMENT FOR CHECK-ROW CORN-PLANTERS.

SPECIFICATION forming part of Letters Patent No. 483,877, dated October 4, 1892.

Application filed June 24, 1892. Serial No. 437,864. (No model.)

*To all whom it may concern:*

Be it known that I, JOHN A. STUFF, a citizen of the United States, residing at Bellville, in the county of Richland and State of Ohio, have invented a new and useful Fertilizer Attachment for Check-Row Corn-Planters, of which the following is a specification.

My invention relates to attachments for check-row corn-planters, the objects in view being to provide a cheap and simple mechanism to be applied to this class of corn-planters and to be operated by the check-row wire or check-row mechanism, and to thereby operate and automatically feed, simultaneously with the planting of the corn, deposits of fertilizing agents, and, furthermore, to provide means for constantly agitating said agents, whereby they are prevented from becoming lumpy and are forced to freely discharge from the fertilizer-hoppers to the furrows.

With these main and other minor objects in view the invention consists in certain features of construction hereinafter specified, and particularly pointed out in the claims.

Figure 1:
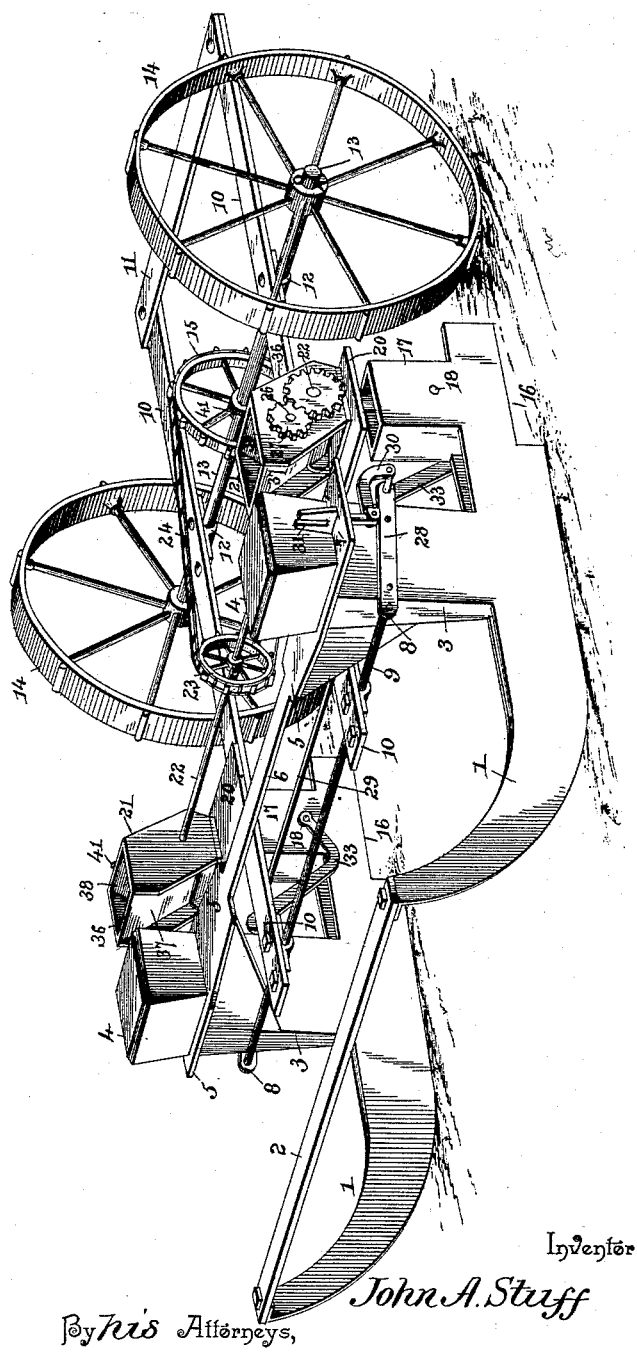
Figure 2:
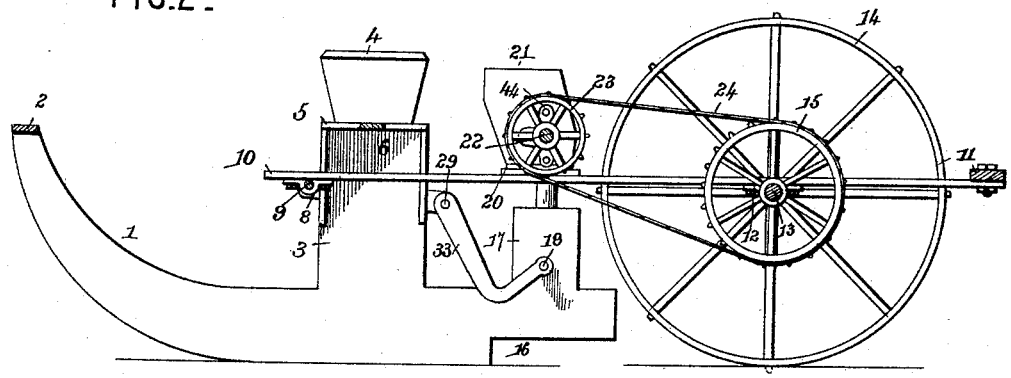
Figure 3:
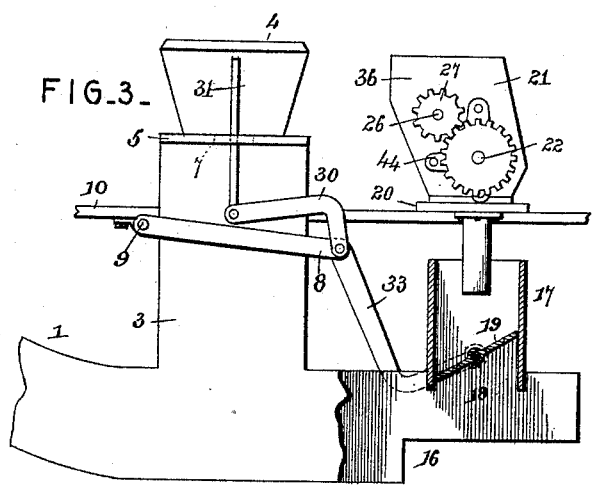
Figure 4:
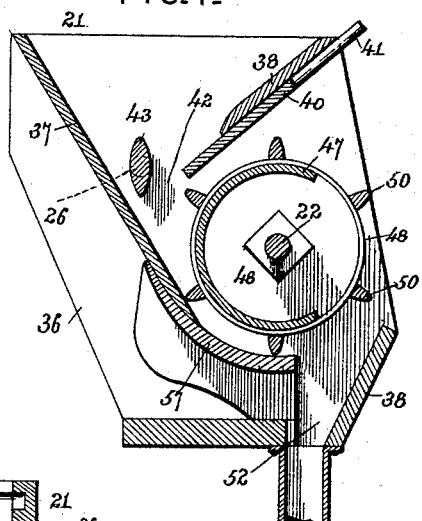
Figure 5:
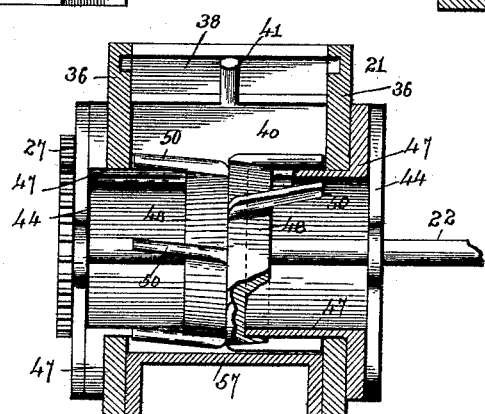

Referring to the drawings, Figure 1 is a perspective view of a corn-planter of the check-row pattern, adapted to be operated by a check-row wire, provided with a fertilizing mechanism embodying my invention. Fig. 2 is a longitudinal section of the same through the center of the machine. Fig. 3 is a longitudinal section through one of the runners, the corn-hopper being shown in side elevation. Figs. 4 and 5 are details in longitudinal and transverse sections, respectively, of the fertilizer-hopper.

Like numerals of reference indicate like parts in all the figures of the drawings.

1 designates the opposite runners of a corn-planter, which are connected at their front ends by the cross-bar 2 and have rising from their upper sides, near their rear ends, seed boots or tubes 3, which at their upper ends support corn-hoppers 4. Hopper-platforms 5 are interposed between the upper ends of the seed boots or tubes and the bottoms of the hoppers are connected at their inner ends by a cross-bar 6, and at their outer ends beyond the hoppers are provided with slots or elongated openings 7. A pair of arms 8 project forward from the seed boots or tubes and are connected beyond the same by a transverse rod 9. Opposite side bars 10 are connected to the rod 9 at their front ends, extend rearward between the corn-hoppers, and have their rear extremities connected by a cross-bar 11. Near these extremities the bars 10 are provided upon their under sides with bearing-boxes 12, and in the boxes there is journaled a transverse axle 13, adapted to rotate. This axle rotates in connection with ground-wheels 14, located beyond the side bars 10, and with a central sprocket-wheel 15, fixed upon the axle between the side bars 10.

So far, with the exception of the sprocket-wheel 15, I have described the construction of an ordinary check-row corn-planter, omitting to mention, thus far, the check mechanism. Various forms of corn-planters may have my invention applied thereto, and I will here state that I do not limit my invention in this respect, but have simply illustrated the same as applied to one of the many constructions now upon the market. Having thus made myself understood in this respect, I will now proceed to describe the fertilizer attachment which constitutes my invention.

The heels of the runners 1 extend rearward beyond the seed-spouts 3, as is usual; but upon their under sides are recesses, as indicated at 16. Upon the upper sides of the runners, opposite these recesses, fertilizer-discharge tubes 17 are mounted and have their lower ends communicating with the furrow through the runner directly in rear of the seed-tubes. In each of the fertilizer-tubes a transverse shaft 18 is journaled, and each shaft carries a small valve 19, which, when nearly horizontally disposed, closes the lower ends of the fertilizer-tubes and prevents the escape of fertilizer. This valve is operated by the check-row mechanism to be hereinafter described. Seated upon each of the tubes 17 is a platform 20, the inner ends of the same being supported by the side bars 10. These platforms each support a fertilizer-hopper 21, whose bottom, through openings in the platforms, communicates with the seed-tubes 17. A transverse shaft 22 passes transversely through the hoppers and across the machine, said shaft extending below the inclined bottoms of the hoppers and therefore not communicating with those portions of the hoppers that receive the fertilizer agent. A sprocket-wheel 23 is mounted upon the shaft 22 and is operatively connected with and driven by the master-sprocket 15 through the medium of a sprocket chain or belt 24.

Short transverse shafts 26 are journaled in the walls of the hoppers and pass through those portions of the hoppers that receive the fertilizer. These shafts are provided with suitable agitator fingers or arms, and at their outer ends are provided with small gear-wheels 27, which are engaged with and operated by somewhat larger wheels located upon the outer ends of the shaft 22. In this manner, as will be obvious, the motion is conveyed from the main axle to the shaft 22, and from thence to the short agitating-shafts with which the hoppers are provided, so that the fertilizer agent is freed from all lumps and forced to drop through the openings in the bottoms of the hoppers into the fertilizer-tubes upon the valves which are operated, as I will now proceed to describe, simultaneously with the seeding mechanism, whereby deposits of fertilizer and corn occur simultaneously.

In bearings 28, extending rearward from the seed-tubes 3, a rock-shaft 29 is journaled, and this rock-shaft at its extremities, which occur beyond the bearings, is provided with crank-shaped rock-arms 30, the upper portions of which extend forward under the outer ends of the platforms 5, that support the seed-hoppers. Forked check-row levers 31, of ordinary construction, extend upward from each of the rock-arms and through the slots 7 of the platforms, where they are supported in position to be acted upon by the check-row wires which they receive, so that as the wires actuate the forked levers the rock-arms are rocked, as is also the shaft upon which they are mounted. This motion is communicated to the valve-shafts 18, and I accomplish this through the medium of intermediate bell-cranked levers 33, the upper ends of which are connected with the rock-shaft and the lower ends of which are connected with the valve-shafts located in the fertilizer-tubes. In this manner, as will be obvious, simultaneous with the discharge of seed occurs the discharge of a deposit of fertilizer, the two being sown together and the mechanisms for discharging both being operated by the same devices.

From the foregoing description, in connection with the accompanying drawings, it will be seen that I have provided a cheap and simple attachment that will require but little, if any, modification of its mechanism to adapt it to any of the various planters now upon the market, and which will add but very slight complication to the planters and may be readily applied or removed therefrom.

Various constructions of fertilizer-hoppers may be employed; but I have herein illustrated one preferred form, in which the numeral 36 indicates a pair of opposite side walls, 37 the front inclined wall, and 38 the rear inclined wall or bottom, below which in the side walls inclined ways are formed. A slide or cut-off 40 is mounted in the ways, and at its rear end is provided with a handle 41, said slide being designed to close the discharge-opening 42, which is formed between the front inclined wall 37 and the lower end of the inclined bottom 38. The agitator-shaft carries a blade 43, and is located slightly above and in rear of the discharge-opening. The walls 36 of the hopper are open and are spanned by a bearing-spider 44, in which are journaled the extremities of the transverse hopper-connecting shaft. Curved flanges 47 are located at the front edges of these openings immediately in rear of and below the discharge and extend inward, terminating adjacent each other, though spaced some little distance apart. A pair of disks 48 is mounted on the shaft between each pair of bearings, the disks having outwardly-disposed flanges at their peripheries, which fit over the adjacent edges of the flanges or shells 47. These disks 48 have a series of inclined fingers 50, projecting outwardly and forwardly therefrom and move down in a circular path over the curved flanges and under the discharge-opening of the hopper. As before stated, I do not limit my invention to this specific construction of hopper, yet, as will be obvious, the same is adapted to effectively and positively feed the fertilizing agent. Parallel to the curved flanges or shells 47 at the front of the machine there is a curved wall 57 below the wall 37, and the same extends rearward, terminating opposite the lower edges of the flanges or shells 47 and above a discharge-opening 52, formed in the bottom of the hopper above the discharge-tube.

Having described my invention, what I claim is—

1. In a corn-planter, the combination, with the opposite runners, the usual framework, seed-hoppers, and check-row levers, of fertilizer-tubes located upon the rear ends of the runners, fertilizer-hoppers supported on the tubes, valves located in the fertilizer-tubes below the hoppers, and devices between the check-row levers and valves for intermittingly operating the valves, substantially as specified.

2. The combination, with the runners, corn-hoppers, and check-row operated corn-discharge mechanism, the same comprising a notched lever, of fertilizer-tubes mounted on the rear ends of the runners, fertilizer-hoppers mounted on the tubes, valves arranged in the tubes, and mechanism between the check-row levers and valves for communicating motion from said levers to the valves, substantially as specified.

3. In a machine of the class described, the combination, with the opposite runners, superposed hoppers, intermediate seed-discharge tubes, and the check-row levers, of fertilizer-discharging tubes mounted on the runners in rear of the hoppers, valves located therein, devices for communicating motion from the check-row levers to the valves, superposed fertilizer-hoppers, an axle, ground-wheels, agitator-shafts mounted in the hoppers, and means for communicating motion from the axle to said agitator-shafts, substantially as specified.

4. In a machine of the class described, the combination, with the runners, the seed-discharge tubes mounted thereon near their rear ends, and the seed-hoppers mounted on the tubes and provided in rear of the same with the bearings, of the rock-shaft mounted in the bearings, the elbow-levers on the ends of the rock-shaft, the slotted check-row levers rising from the elbow-levers at the sides of the seed-hoppers, the fertilizer-discharging tubes mounted on the heels of the runners, the hoppers thereon having inclined bottoms, a transverse shaft connecting the hoppers below the bottoms, a sprocket-wheel at the center of the shaft, a gear-wheel at each end of the shaft, agitating-shafts mounted in the hoppers, gear-wheels on the same, meshing with those of the transverse shaft, an axle, ground-wheels, a sprocket-wheel mounted on the axle, an endless sprocket-chain connecting the sprocket-wheel with that of the transverse shaft, and elbow-levers connecting the rock-shaft with the shafts of the valves in the fertilizer-tubes, substantially as specified.

5. In a machine of the class described, the combination, with the runners, seed-hoppers, and means for operating the same, of the fertilizer-hoppers mounted on the rear ends of the runners, a shaft connecting the two, means for operating the shaft, openings formed in the opposite sides of the hoppers and in the bottoms of the same, bearing-spiders mounted in the openings for supporting the shaft, front and rear inclined walls above the shaft, curved flanges or shells parallel to each other and located below the discharge-opening in the hoppers, and the pairs of disks mounted in each hopper and having outwardly-disposed fingers moving between the flanges or shells, substantially as specified.

6. In a machine of the class described, the combination, with the runners, seed-hoppers, and means for operating the same, of the fertilizer-hoppers mounted on the rear ends of the runners, a shaft connecting the two, means for operating the shaft, openings formed in the opposite sides of the hoppers and in the bottoms of the same, bearing-spiders mounted in the openings for supporting the shaft, front and rear inclined walls above the shaft, curved flanges or shells parallel to each other and located below the discharge-opening in the hoppers, the pairs of disks mounted in each hopper, guides located under the rear wall of the hopper, a cut-off mounted in the guides, a transverse agitator-shaft, a longitudinal blade on the same, and means for communicating motion from the transverse shaft to the agitator-shaft, substantially as specified.

In testimony that I claim the foregoing as my own I have hereto affixed my signature in the presence of two witnesses.

JOHN A. STUFF.

Witnesses:
  E. D. WALKER,
  W. W. COLEMAN.